Oct. 23, 1951  J. A. HOCKENHULL  2,572,340
DRIFTABLE WIND PROPELLED FISHING LINE CARRIER
Filed April 11, 1949

Inventor
Joseph A. Hockenhull

By  Clarence A. O'Brien
and Harvey B. Jacobson
Attorneys

Patented Oct. 23, 1951

2,572,340

UNITED STATES PATENT OFFICE 2,572,340

DRIFTABLE WIND PROPELLED FISHING LINE CARRIER

Joseph A. Hockenhull, Currie, Minn.

Application April 11, 1949, Serial No. 86,648

2 Claims. (Cl. 43—44.9)

The present invention relates to a novel and improved device which is connectable with the free sinker and hook equipped end of a fishing line and which functions to carry the line out to the position wanted by the fisherman.

More specifically, the invention has to do with simple and practical line carrier means, said means being buoyant and of such construction that it is automatically borne outward by wind currents while remaining afloat, making it possible for the fisherman to merely drop the carrier overboard from a dock, boat or even from the shore, after which it is floated and drifted, wind propelled, from the windward side of the boat until it is stopped, by checking the line, at the desired fishing area.

In reducing to practice a preferred and specific embodiment of my idea I utilize a simple and economical floatable base which, as stated, is unique in that it is adapted to be borne outward by wind currents, said base serving to support a cork or bob and the latter having a passage in which the fishing line is slidably mounted.

In addition to the above, novelty is predicated upon a substantially rectangular block-like float, which constitutes a wind propelled base, said block being provided centrally with a hole for removable reception of a tapered cork and said cork being centrally bored and fitted with a sleeve-like bushing through which the co-acting portion of the line slides.

Other objects and advantages will become more readily apparent from the following description and the accompanying illustrative drawings.

In the accompanying sheet of drawings, wherein like numerals are employed to designate like parts throughout the views.

Figures 1, 2, 3:
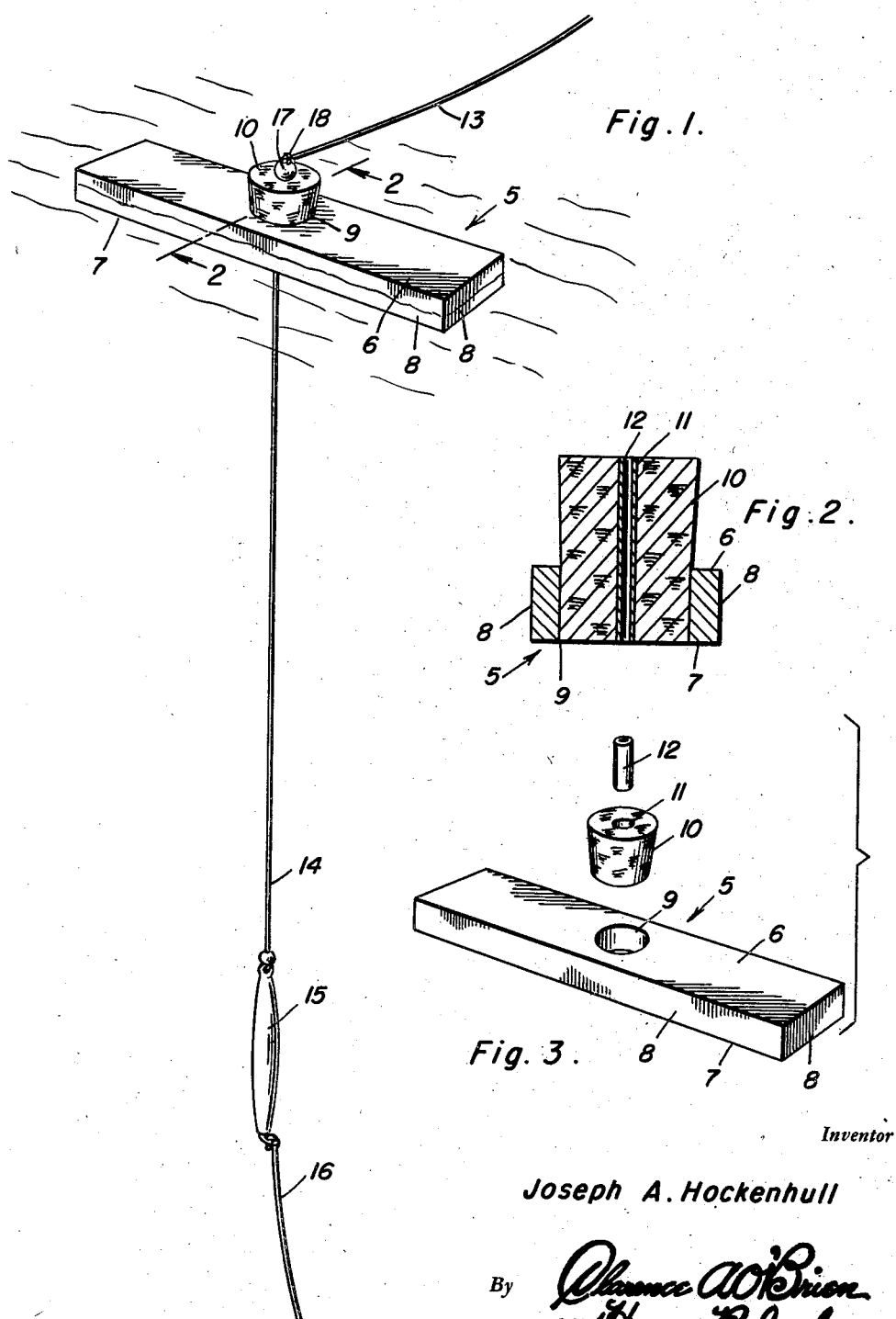
Figure 1 is a perspective view of a drift-type wind propelled floatable line carrier constructed in accordance with the principles of the present invention and showing the manner in which the fishing line is adjustably attached thereto.
Figure 2 is an enlarged transverse or cross section on the line 2—2 of Figure 1 with the line omitted.
Figure 3 is a group perspective view of the carrier with its complemental parts shown separately.

Referring now to the drawings by reference numerals and lead lines and with reference to Figure 3 it will be seen that the stated base is noted by the numeral 5, the same being an elongated rectangular block. Said block is of appropriate buoyant material and could well be referred to as a float. It has flat top, bottom and marginal surfaces 6, 7 and 8 respectively sufficient in size to permit wind currents to play there-against and to ride or drift the block, while afloat, and in a windward direction. Thus, the base becomes a driftable wind propelled carrier. At its center it is provided with a hole 9 for removable reception of a tapered cork, 10, constituting the aforementioned bob. The bob is removably plugged into the hole 9 and is of a vertical height so that its upper half portion projects well above the top surface 6 of the base. Thus projecting upwardly from the base the bob functions as an indicator or signal and facilitates spotting the position of the outer end of the fishing line. As previously stated the bob has a central bore or passage 11 passing therethrough and this is lined with a sleeve 12 which functions as a bushing.

The fishing line is denoted by the numeral 13 and the free end portion 14 carries a conventional sinker 15 which, in turn, carries the hook leader 16. The portion 14 of the line passes downwardly through the bushing in the manner shown in Figure 1. The line is also provided with a ball-check 17 which is located and held by a stop-knot 18 formed in the line 13. The ball-check comes into abutting relationship with the cork and thus enables the hanging portion of the line to be regulated.

From the foregoing it will be seen that I have evolved and produced a simple, practical and economical fishing line carrier of a wind propelled type in which users will find their needs and requirements fully and satisfactorily contained.

With this type of line carrier it is not at all necessary to attempt to cast the line a great distance from base. As a matter of fact, the fisherman may stand on a dock or boat and throw the line a short distance out whereupon the carrier, floating atop the water, will drift in a windward direction to such distance as wanted by paying out the hand-held or reel end of the line, in an obvious manner.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A drift-type wind propelled fishing line carrier comprising a rectangular block of buoyant material having flat top, bottom and marginal surfaces and provided midway of its transverse ends with a relatively large hole opening through said top and bottom surfaces, said bottom surface being wholly free of obstructions, a centrally bored cork inserted removably in said hole, the lower end of said cork being substantially flush with the bottom surface of said block, said cork being of a length greater than the thickness of said block whereby the upper portion of said cork projects to a plane above said top surface to function as a line position indicator.

2. The combination of claim 1, wherein said cork constitutes a truncated cone frictionally but removably fitted into said hole and wherein said bore is lined with a wear resisting bushing.

JOSEPH A. HOCKENHULL.

REFERENCES CITED

The following references are of record in the file of this patent:

UNITED STATES PATENTS

| Number | Name | Date |
| --- | --- | --- |
| 522,167 | Rawlings | June 26, 1894 |
| 771,263 | McCord | Oct. 4, 1904 |
| 1,163,285 | Tussing | Dec. 7, 1915 |
| 1,227,300 | Oberg | May 22, 1917 |
| 1,489,088 | McMindes | Apr. 1, 1924 |
| 1,802,260 | Kopsho | Apr. 21, 1931 |

FOREIGN PATENTS

| Number | Country | Date |
| --- | --- | --- |
| 455,264 | France | May 20, 1913 |
| 385,585 | Great Britain | Mar. 23, 1931 |